Patented July 26, 1949

2,477,539

UNITED STATES PATENT OFFICE 2,477,539

GELATIN

Donald P. Grettie and Harland H. Young, Chicago, Ill., assignors to Swift & Company, Chicago, Ill., a corporation of Illinois No Drawing. Application May 26, 1947,
Serial No. 750,646

11 Claims. (Cl. 99—130)

This invention relates to a method for improving the whipping qualities of gelatin to be used for edible or inedible purposes.

An important characteristic of gelatin used in marshmallow formulas and various formulas for producing inedible gelatin foam is the whipping quality.

One of the objects of the present invention is to provide a method for the improvement of the whipping qualities of gelatin for use in such products as marshmallows without the necessity of adversely affecting either the viscosity or the jelly strength of the gelatin.

Another object of the invention is to provide a new gelatin product having improved whipping qualities even after a prolonged holding period.

Other objects and purposes of this invention will become apparent from the description and claims which follow.

The present invention contemplates a treatment of gelatin by the addition of salts or acids whose negatively charged polyvalent ions combine with the gelatin molecule. Heretofore, the hydrates of phosphorus pentoxide in all stages of complexity and inorganic salts of the hydrates in all stages of complexity have been suggested for use in gelatin intended for edible purposes while molybdates, polymolybdates, tungstates, polytungstates, phosphotungstic acid, and phosphomolybdates have been suggested for use in the treatment of gelatin intended for inedible purposes.

The present invention involves the addition of condensation products of inositol with phosphoric acid, such as inositol-hexaphosphoric acid, commonly known as phytic acid, to gelatin. The effect produced by the addition of small amounts of phytic acid to gelatin manufactured for use in marshmallow formulas is set forth in the table:

Table

| Sample | Weight per gallon of marshmallow whip after the following time intervals | | |
|---|---|---|---|
| | 8 min. | 12 min. | 15 min. |
| Acid cured gelatin control (225 gr. Bloom) | Pounds 3.3 | Pounds 2.86 | Pounds 2.74 |
| Acid cured gelatin containing 5% phytic acid | 2.74 | 2.32 | 2.26 |
| Acid cured gelatin containing 2.5% phytic acid | 2.96 | 2.52 | 2.42 |
| Acid cured gelatin containing 2.5% phytic acid, stored 16 months | 2.98 | 2.60 | 2.50 |

It is apparent from the table that the addition of phytic acid to gelatin causes the marshmallow formula containing the modified gelatin to whip to a lighter marshmallow than when no phytic acid is used. Furthermore, it is also evident from the table that acid cured gelatin containing 2.5 phytic acid which was stored for 16 months retained substantially all the whipping properties shown by a freshly prepared phytic acid gelatin mix. This is characteristic of the newly discovered gelatin mix since the phytic acid contained therein is much more stable to hydrolysis than is sodium hexametaphosphate or any of the previously known edible improving agents. Sodium hexametaphosphate has been found to be unstable in the presence of moisture and slowly reacts to form the orthophosphate which does not produce the desired whipping properties in gelatin.

It has been found that the improving substance is equally effective when added to the gelatin liquor after the final filtration before drying or when added directly to the marshmallow mix just before whipping. In commercial practice the improving substance is commonly added as an aqueous solution to the heavy evaporated gelatin liquors just before they are spread on the belts to gel in sheets preparatory to drying.

It has been found that the addition of from 0.5% to 10% of the improving substance based upon the dry weight of gelatin is particularly effective. It will be observed from the table that the addition of 5% of phytic acid has more effect than the addition of 2.5% phytic acid. For most purposes, however, it is thought that the addition of 2.5% of the improving agent will be sufficient to produce the desired effect.

The present invention contemplates the use of the salts of phytic acid as well as the acid itself. When the salts of phytic acid are employed, the gelatin must be sufficiently acid to liberate phytic acid. A normal acid cured and cooked gelatin has sufficient acidity to liberate phytic acid from the salt thereof without any further addition of acid to the gelatin. Where an alkaline cured and cooked gelatin is employed, it is necessary to acidify the gelatin to secure the beneficial effects of the addition of the salt. Since phytic acid is relatively stable, however, it is generally preferred to add the acid directly.

As is well known, phytic acid is the hexaphosphate of inositol, a cyclic alcohol having the formula $C_6H_6(OH)_6$, and is associated with phytin, a calcium-magnesium salt of phytic acid occurring as a phosphorus reserved material in seeds, tubers, and green plants. Phytic acid is readily recovered as its calcium salt from the steep liqors in the processing of corn in the manufacture of corn starch and has the chemical formula $C_6H_{18}O_{24}P_6$. To obtain phytic acid from the calcium salt thereof calcium phytate is treated with an equivalent amount of dilute sulphuric acid which decomposes the calcium salt to phytic acid and calcium sulphate. Since the calcium sulphate is insoluble, it settles to the bottom and phytic acid remains in solution. The supernatant liquor containing the phytic acid may be added to gelatin after the final filtration before drying or added directly to the marshmallow mix before whipping.

When the salts are employed it is preferable to employ water soluble salts although other salts may be employed whether water soluble or not.

In inedible gelatin condensation product of inositol and molybdic acid, polymolybdic acid, tungstic acid, polytungstic acid, phosphotungstic acid and the salts thereof, and phosphomolybdic acid and the salts thereof may be employed in the process even though these materials are poisonous and could not be used in edible gelatin. The effect of the addition of small amounts of these compounds to gelatin in a marshmallow formula which may be used for preparing an inedible foam is similar to that obtained upon the addition of the phytic acid composition to edible gelatin products.

Although the hexaphosphate of inositol which has been used as the specific embodiment of the present invention is derived by the condensation of six molecules of the acid with inositol, it is not necessary for each molecule of the added improving composition to have six molecules of acid condensed thereon.

Obviously, many modifications and variations of the inventions as hereinbefore set forth may be made without departing from the spirit and scope thereof, and therefore, only such limitations should be imposed as are indicated in the appended claims.

We claim:

1. The method of treating gelatin to improve the whipping properties thereof even after a prolonged holding period which comprises adding thereto a substance from the class consisting of the condensation product of inositol and an acid selected from the group consisting of phosphoric acid, molybdic acid, polymolybdic acid, tungstic acid, polytungstic acid, phosphotungstic acid, phosphomolybdic acid, and the salts of said condensation products.

2. The method of treating gelatin used in the preparation of marshmallow which comprises adding thereto phytic acid to improve the whipping properties thereof even after a prolonged holding period.

3. The method of treating gelatin used in the preparation of marshmallow which comprises adding thereto a water soluble salt of phytic acid to improve the whipping properties thereof even after a prolonged holding period.

4. An improved gelatin product having excellent whipping properties even after a prolonged holding period comprising gelatin and a substance from the class consisting of the condensation product of inositol and an acid selected from the group consisting of phosphoric acid, molybdic acid, polymolybdic acid, tungstic acid, polytungstic acid, phosphotungstic acid, phosphomolybdic acid, and the salts of said condensation products.

5. An improved gelatin product having excellent whipping properties even after a prolonged holding period comprising gelatin and phytic acid.

6. A marshmallow product comprising gelatin and phytic acid.

7. A method of treating gelatin to improve the whipping properties thereof even after a prolonged holding period which comprises adding to gelatin the condensation product of inositol and phosphoric acid.

8. A method of treating gelatin to improve the whipping properties thereof even after a prolonged holding period which comprises adding to gelatin between approximately 0.5 and 10 per cent phytic acid based on the dry weight of the gelatin.

9. A gelatin product having improved whipping properties even after a prolonged holding period which comprises gelatin and the condensation product of inositol and phosphoric acid.

10. An improved gelatin product for use in the preparation of marshmallow which comprises gelatin and between approximately 0.5 and 10 per cent phytic acid based on the dry weight of the gelatin.

11. A marshmallow product comprising gelatin and between approximately 0.5 and 10 per cent phytic acid based on the dry weight of the gelatin.

DONALD P. GRETTIE.
HARLAND H. YOUNG.

REFERENCES CITED

The following references are of record in the file of this patent:

UNITED STATES PATENTS

| Number | Name | Date |
|---|---|---|
| 1,721,214 | Goedecke | July 16, 1929 |
| 2,196,300 | Grettie | Apr. 9, 1940 |